(12) United States Patent
King

(10) Patent No.: US 6,389,385 B1
(45) Date of Patent: May 14, 2002

(54) SYSTEM AND METHOD FOR TRANSLATING SOURCE CODE

(75) Inventor: Robert L. King, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/346,357

(22) Filed: Jul. 2, 1999

(51) Int. Cl.[7] .............................................. G06F 9/455
(52) U.S. Cl. ................................. 703/27; 717/5; 704/7
(58) Field of Search ........................... 704/7, 8; 705/30; 707/103; 709/107, 316, 315; 710/65; 717/10, 5; 341/106; 703/27

(56) References Cited

U.S. PATENT DOCUMENTS

| | | | | |
|---|---|---|---|---|
| 4,729,096 A | | 3/1988 | Larson ........................ | 364/300 |
| 5,201,042 A | | 4/1993 | Weisner et al. ............. | 395/500 |
| 5,564,113 A | | 10/1996 | Bergen et al. .............. | 395/600 |
| 5,694,601 A | | 12/1997 | White ......................... | 395/671 |
| 5,701,423 A | | 12/1997 | Crozier ....................... | 395/335 |
| 5,754,845 A | | 5/1998 | White ......................... | 395/610 |
| 5,831,560 A | * | 11/1998 | Gelfenbain ................. | 341/106 |
| 5,838,980 A | | 11/1998 | Guillen et al. .............. | 395/708 |
| 5,898,874 A | * | 4/1999 | Gelfenbain .................... | 717/5 |

OTHER PUBLICATIONS

"Model for Building and Running AS/400 RPG Program in a Java Virtual Machine", *Research Disclosure*, No. 40789, Mar. 1998, pp. 303–305.

"Automatic Retrieval of Program Design Information from Source Code", *IBM Technical Disclosure Bulletin*, vol. 30, No. 12, May 1988, pp. 120–123.

"Assignment Scheme for Round Trip Integrity", *IBM Technical Disclosure Bulletin*, vol. 30, No. 10, Mar. 1998, pp. 93–95.

"Maintain Design and Program Source Together as One Entity", *IBM Technical Disclosure Bulletin*, vol. 38, No. 3, Mar. 1995, pp. 21–28.

* cited by examiner

*Primary Examiner*—Kevin J. Teska
*Assistant Examiner*—Kandasamy Thangavelu
(74) *Attorney, Agent, or Firm*—Shelly M Beckstrand

(57) ABSTRACT

A safe system and method for reversibly translating source code between unlike character sets, or formats, includes a mapping table of syntactically necessary characters and, possibly, other frequently used characters, for translating source characters from a first format to a second format. A marker character is used to replace other characters in the source code while preserving the original, replaced source characters in a comment file. Upon reverse translating, syntactically necessary characters are translated back into the first format using the mapping table, and marker characters are replaced by original source characters from the comment file.

8 Claims, 5 Drawing Sheets

SYSTEM AND METHOD FOR TRANSLATING SOURCE CODE

BACKGROUND OF THE INVENTION

1. Technical Field of the Invention

This invention pertains to source code translation. More particularly, it relates to a safe system and method for reversibly translating source code between unlike character sets.

2. Background Art

More and more often companies are using workstation tools to change or maintain mainframe software source code. However, the mainframes use the IBM EBCDIC character encoding system while workstations use the ASCII system. For the most used characters, there are safe and reversible mappings between the two encoding systems. Unfortunately, this is not true for all possible characters, because there are no equivalents in both systems, because of varying locations of characters within variations of the same system, and because some characters have special control meanings in each system.

Generally, each programming language uses a set of characters for its operational syntax. By ensuring these characters are mapped reversibly, a translated program can be made to compile on both the mainframe and the workstation. However, mainframe software source code may contain any of the 256 possible characters in program comments and program text literals. Although the usual frequency of occurrence of unsafe characters is very small, if any of those characters are translated to workstation control characters, the program may not compile or be editable or even viewable. If any of those characters are not mapped in a reversible way, they will be different when the program is returned to the mainframe. At best, this may make a comment less understandable; at worst it will change the data in a program literal with unpredictable and possibly disastrous results if not corrected.

Generally, the upload and download character translation mapping tables are synchronized as much as possible for the most used characters. This often fails because it is not always possible to use the same tool or synchronized tables for both the upload and download. It also doesn't allow all 256 possible values to be safely translated. Usually, separate fix-up work is required to detect and correct translation errors.

Consequently, there is a need in the art for a translation system and method which eliminates the need for maintaining synchronized translation mapping tables and the need for separate fix-up work.

Another solution is to use a special escape character before an untranslated value and then convert the untranslated value to a two character value in hexadecimal format. This solution does not work with source code because it changes the length of certain records and, more importantly, it changes the length of program literals, which could make the program not compile.

Consequently, there is a need in the art for a translation system and method which does not change the length of source code records or program text literals.

It is an object of the invention to provide an improved system and method for translating source code.

It is a further object of the invention to provide a system and method for translating source code such that it is possible to move mainframe software source code to a workstation, operate on the code, and move it back to the mainframe, knowing that the character translations are safe and reversible.

It is a further object of the invention to provide a system and method for translating source code which eliminates errors due to unsafe and un-reversible translations both on the workstation and on the mainframe.

SUMMARY OF THE INVENTION

A system and method is provide for translating source code. A mapping table of syntactically necessary characters is provided for translating source characters from a first format to a second format. A marker character is used to replace other characters in the source code while translating and preserving the original, replaced source character in a comment file. Upon reverse translating, syntactically necessary characters are translated back into the first format using the mapping table, and marker characters are replaced by reverse translated original source characters from the comment file.

In accordance with a more specific embodiment of the invention, original characters replaced by the marker character are translated into a two-character hexadecimal representation, and then reverse translated from that two-character hexadecimal representation back into original source characters, in order to keep the original characters replaced by the marker character from preventing compilation or editing.

In accordance with an aspect of the invention, there is provided a computer program product configured to be operable to translate source code using a mapping table, a marker character, and a comment file of source code characters replaced by the marker character.

Other features and advantages of this invention will become apparent from the following detailed description of the presently preferred embodiment of the invention, taken in conjunction with the accompanying drawings.

BRIEF DESCRIPTION OF THE DRAWINGS

FIG. 6 is an example of the translation and a line in the comment file.

BEST MODE FOR CARRYING OUT THE INVENTION

Figure 1:
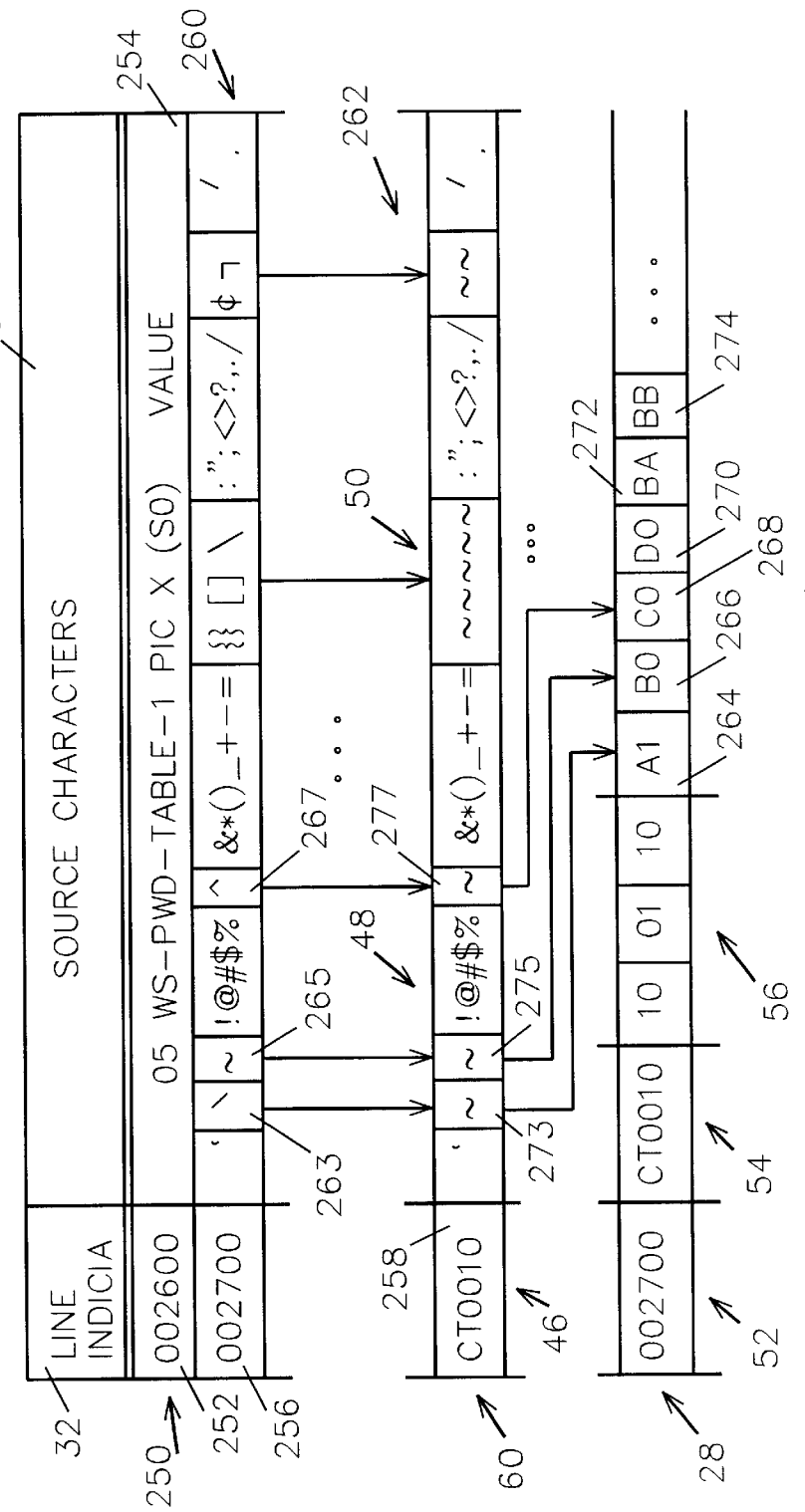
FIG. 1 is a high level system diagram.

Referring to FIG. 1, host main frame 20 is operable to download source code to workstation 22.

Figure 2:
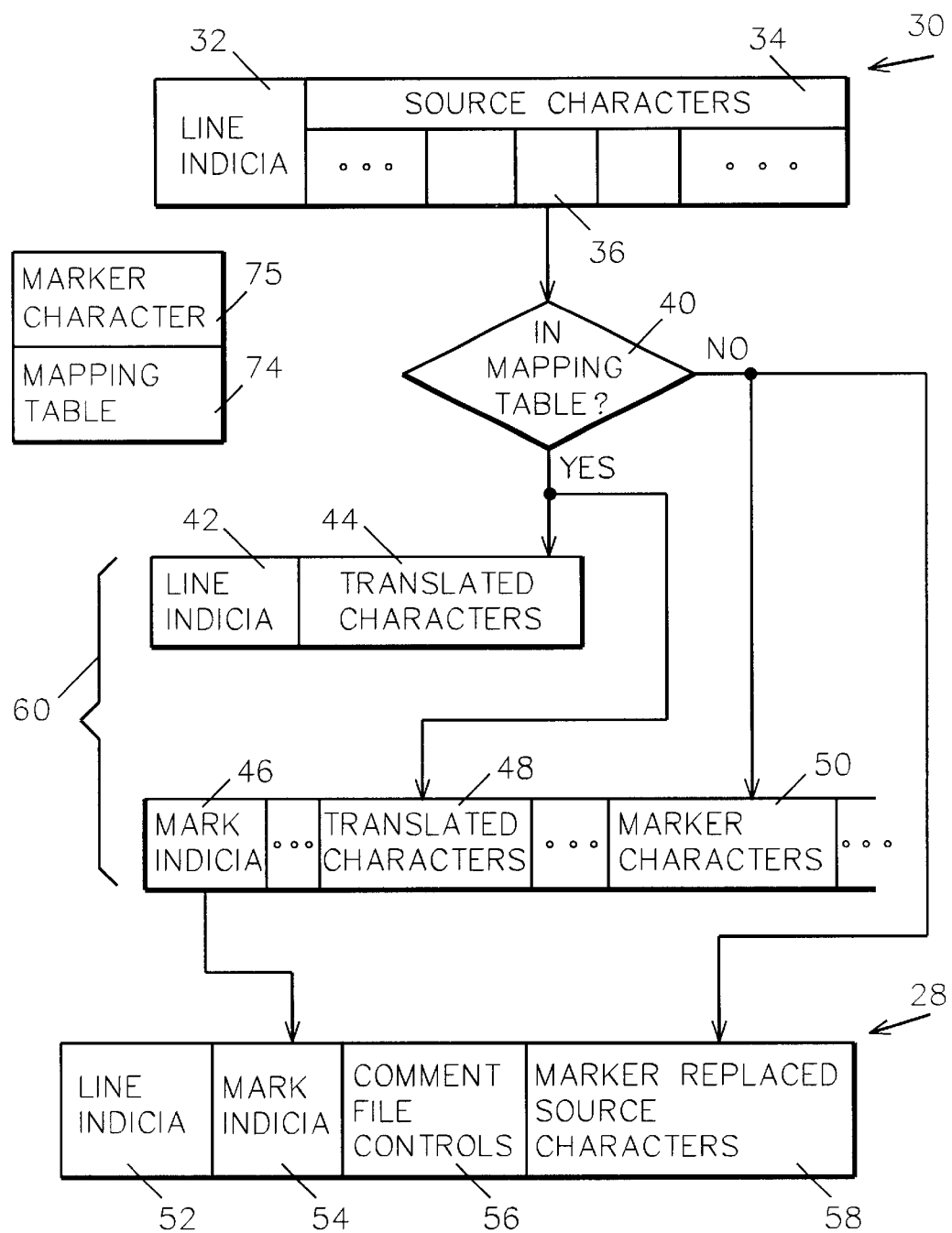
FIG. 2 is a diagrammatic representation of source code translation in accordance with a preferred embodiment of the invention.

Referring to FIG. 2, system components for code translation are shown. Source code 30 includes a plurality of lines of code, each line including a line indicia field 32 (for example, line number) and a character field including a plurality of characters 36 (in, for example, EBCDIC format).

Translated file 60 includes a plurality of source code lines, each line carrying either line indicia 42 corresponding to line indicia 32 for lines containing only translated characters 44, or mark indicia (also referred to as distinguishing value) 46 replacing line indicia 32 in those lines containing one or more marker characters 50 typically in addition to translated characters 48 (in, for example, ASCII format).

Source characters 36 are individually examined by test 40 to determine if character 36 is included in mapping table 74. If so, character 36 is translated using table 74 and the translated character put into translated character position 44 or 48; if not, character 36 is replaced by marker character 75 and put into marker character field 50, and the original source character 36 put into comment file 28 marker replaced source character field 58. Comment file 28 includes a commented (hence, not compilable) line for each source line having a mark indicia 46, and includes line indicia field 52 which is the line indicia field 42 for lines where a mark indicia 46 has replaced field 42, mark indicia field 54 corresponding to mark indicia 46, marker replaced source characters field 58, in two-character hexadecimal representation, and comment file controls 56, which includes parameters indicating the number of lines in commented file 28 corresponding to this mark indicia 54, the number of marker replaced source characters corresponding to this mark indicia 54, and the number of marker replaced source characters 58 on this line of comment file 28.

Figure 3:
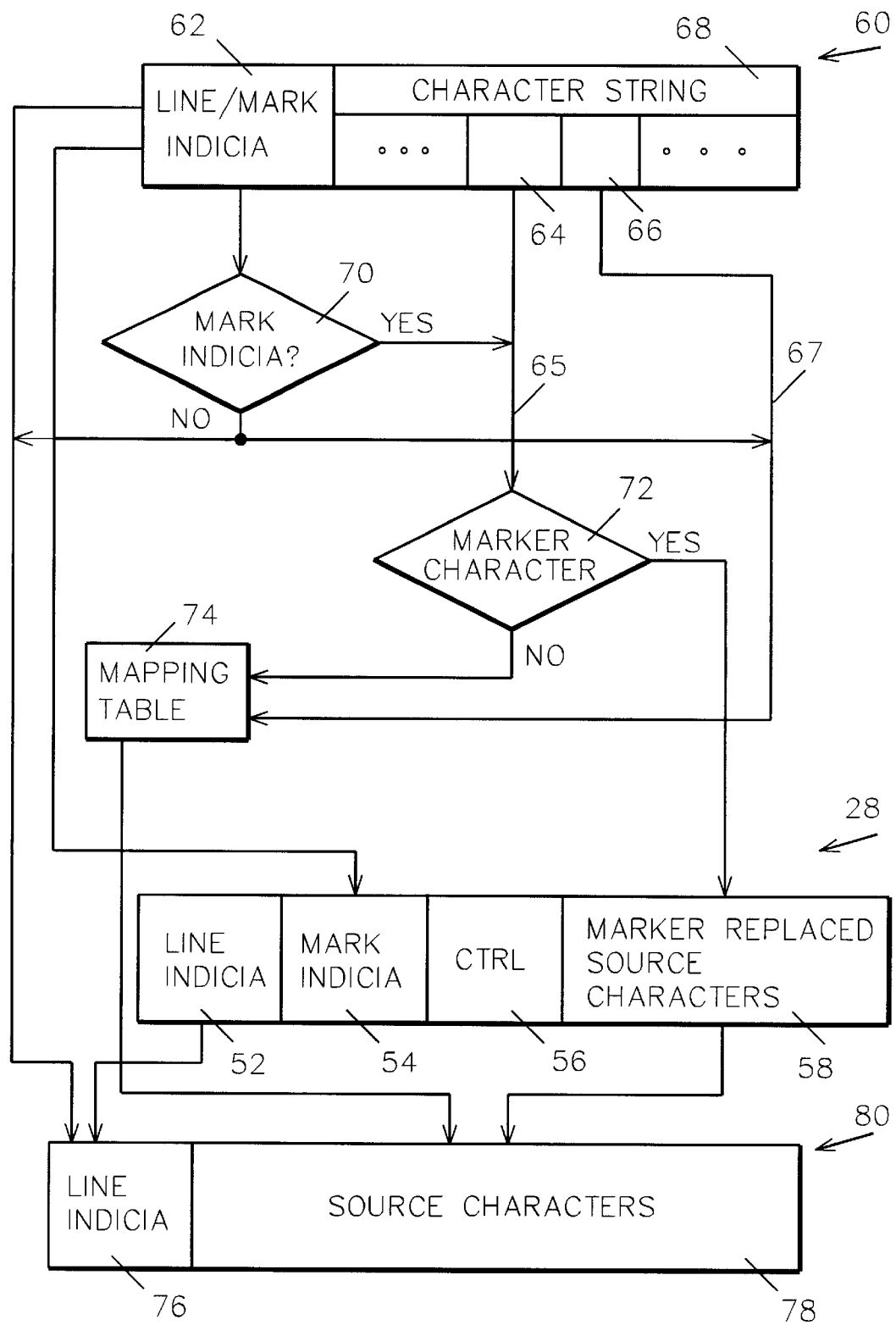
FIG. 3 is a diagrammatic representation of source code reverse translation in accordance with a preferred embodiment of the invention.

Referring to FIG. 3, system components for reverse code translation are illustrated. Translated source code 60 includes a plurality of lines of code corresponding to translated code lines 60. Each line of code in source file 60 includes an indicia field 62 containing either a line indicia or a mark indicia, and a character string selectively including translated characters 44, 48 and marker characters 50.

Reverse translated source file 80 includes a plurality of lines of source code, each line including line indicia field 76 and source characters 78. Mark indicia test 70 and marker character test block 72 control the manner in which line indicia field 76 and source character field 78 are populated. As each line of source code in translated source file 60 is parsed, if line/mark indicia field 62 contains a line indicia, that line indicia 62 is placed in line indicia field 76 for the line of reverse translated file 80 corresponding to this line of translated source file 60, and each character 66 in character string 68 is translated using table 74 and loaded into the corresponding character location in source characters field 78. If line/mark indicia field 62 contains a mark indicia, which indicates one or more characters 64 in character string 68 are mark characters, then each character 64, 66 is examined by block 72 to determine if it is a marker character. If it is not, the character 64 is translated using mapping table 74 back into the original source character and put to source character field 78 in the corresponding character position. If character 64 is a marker character, then commented file 28 is accessed using mark indicia 62 to locate the corresponding mark indicia field 54, and marker replaced source characters field 58 accessed to determine the original source code character corresponding to this marker character, which is then moved into source character field 78 in the corresponding character position. If indicia field 62 for this source line contains a mark indicia, then commented file 28 is accessed to locate and load into line indicia field 76 the line indicia 52 for this mark indicia 54.

Figure 4:
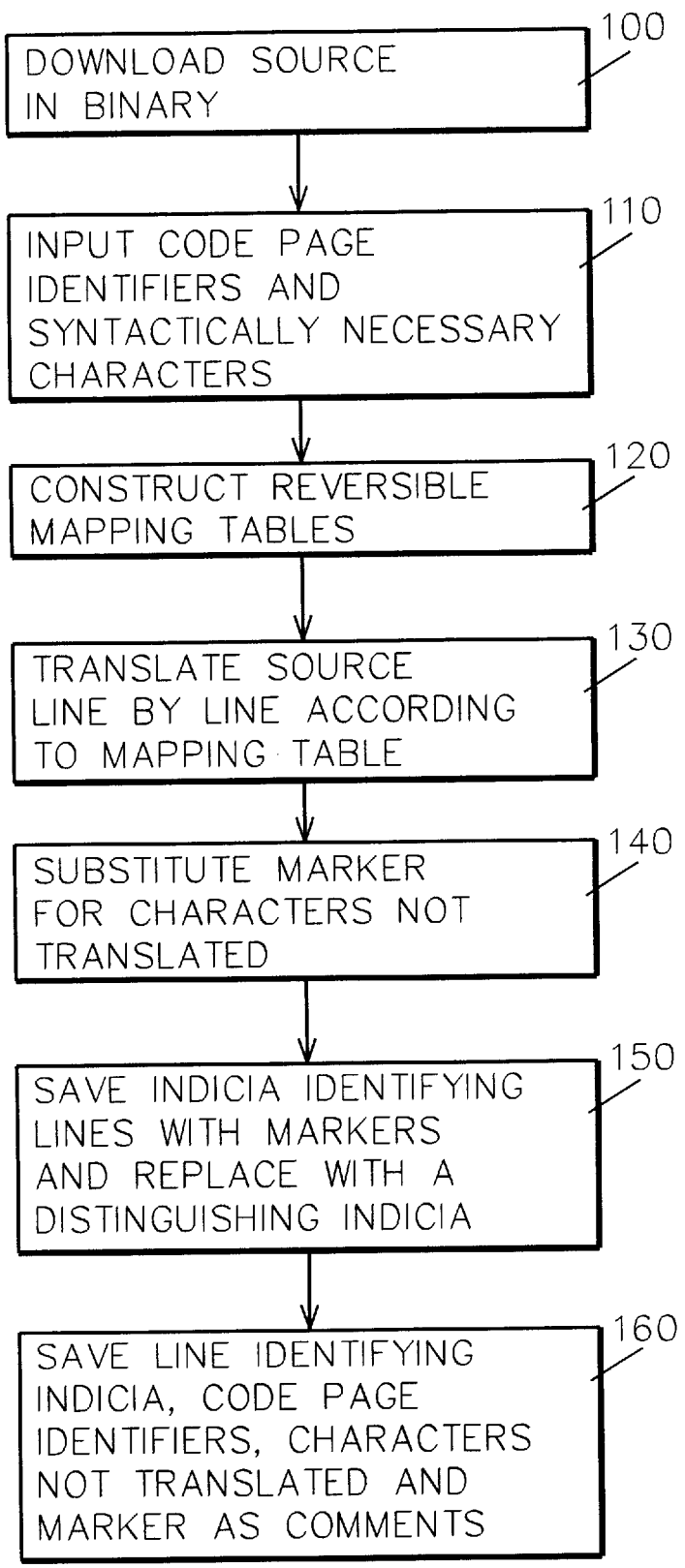
FIG. 4 is a flow diagram of the method of the invention for source code translation.

Referring to FIG. 4 in connection with FIG. 2, in accordance with the preferred embodiment of the method of the invention, in step 100 source code files 30 are downloaded from the mainframe 20 to the workstation 22 in binary format (no character translation is performed by the download process). In the exemplary embodiment described hereafter, EBCDIC is translated to ASCII, and ASCII is reverse translated to EBCDIC. Of course, as will be apparent to those skilled in the art, the translation/reverse translation process described hereafter may be applied to most any two data formats.

Translating from EBCDIC to ASCII

In step 110, the EBCDIC and ASCII code page identifiers and the syntactically necessary characters and other commonly used characters are provided as input.

In step 120, reversible mapping table 74 for the syntactically necessary and common character is constructed.

In step 130, source code files 30 are examined file by file, line by line, translating the syntactically necessary and common characters 36 according to the constructed mapping table 74.

In step 140, a special marker character 75 is ii substituted for characters 36 that are not translated; this marker character is not one of the syntactically necessary or common characters.

In step 150, the value of the serial or sequence number field 32 of each line with marker characters 50 is saved in commented file 28 field 52, and replaced with a distinguishing value (mark indicia) 46 that identifies that particular line.

At the end of the source code file (or in a separate file), program comments 28 are added that save, in original program order, the original contents 52 of the serial or sequence number fields 32 and the original contents, as two character hexadecimal numbers, of all characters 36 that had the marker character 75 substituted in marker character 50, as well as the specified code page identifiers and marker character.

The output source files 60 can now be processed on the workstation.

Simple manual procedures are used if source code lines 60 with marker characters 50 are changed, duplicated, commented out, or reordered.

Translating from ASCII to EBCDIC

Figure 5:
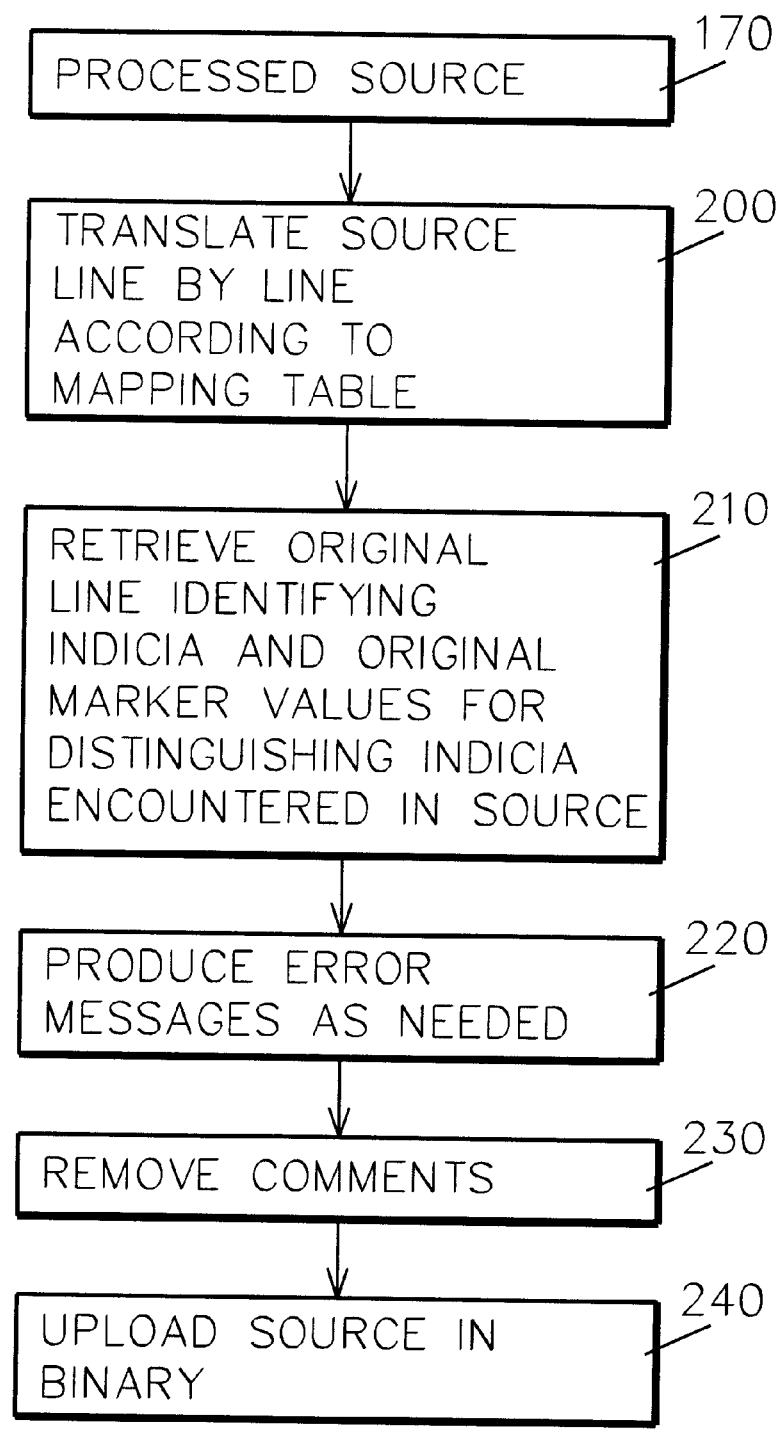
FIG. 5 is a flow diagram of the method of the invention for source code reverse translation.

Referring to FIG. 5 in connection with FIG. 3, in steps 170 and 200, the source files 60 are examined file by file, line by line, translating the syntactically necessary characters 64, 66 according to the constructed mapping table 74.

In step 210, when the distinguishing values (mark indicia) in the serial or sequence number fields 62 are encountered in translated source file 60, their original values are retrieved from the program comments 28 as well as the original values 58 of the special marker characters 64, 66.

In step 220, if in file 60, marker characters 50 are missing or added or if distinguishing values 46 are missing, out of order, or added, error messages are produced.

In step 230, the added comments 28 at the end of the source code files are removed.

In step 240, the source code files 80 are uploaded to the mainframe 20 from the workstation 22 in binary format.

In accordance with an aspect of the invention, the need for maintaining synchronized translation mapping tables and the need for separate fix-up work is eliminated by providing that all character translations use the same mapping tables 74 and are done on the same platform 22.

Referring to FIG. 6 in connection with Tables 1 and 2 a before and after translation example is illustrated. In this example, the marker character is the tilde "". In FIG. 6, source file 30 corresponds to two source lines from Table 1, and source line 60 and comment line 28 represent two of the lines in Table 2.

Source line 250 includes line indicia 002600 in field 252, followed by source characters 05 WS-PWD-TABLE-1 PIC X(50) VALUE in field 254. All of the characters in field 254 are syntactically necessary or commonly used characters, and will all appear in mapping table 74. In accordance with the exemplary embodiment of the invention for translating from EBCDIC to ASCII, each EBCDIC character 254 in code line corresponding to line indicia 002600 in Table 1 is translated using mapping table 74 into an ASCII character in code line corresponding to line indicia 002600 in Table 2.

Source code line 260 includes line indicia 002700 in line indicia field 256, and a character string including characters 263, 265, 267. The accent grave "" 263, tilde "" 265, and caret "^" are examples of characters not included in mapping table 74 and these, among others, must be replaced in translated source file 60 by the marker character, the tilde "" in corresponding character positions 273, 275 and 277, respectively. Because translated source code line 60 includes marker characters 273, 275, 277, etc., line indicia field 32 is loaded with a mark indicia CT0010 258, and a corresponding comment line provided in comment area or file 28 into which the original line indicia for this line 002700 is placed in field 52, the mark indicia CT0010 placed in field 54, and the original source characters 263, 265, 267 put in marker replaced source characters field 58, as hex values A1 (the hex designation for the EBCDIC value for the accent grave) in character position 264, hex value B0 (the tilde) in character position 266, hex value C0 (the caret) in character position 268. Comment code field 56 contains the values 10 01 10 which, in this example, represent the following: 10 marker characters (tilde) correspond to the line identified by mark indicia CT0010, 01 lines in this file 28 contain the marker replaced source characters, and there are on this comment line 10 such characters 264, 266, 268, 270, 274, . . . , respectively.

Field 52 contains the original line indicia (sequence number) 002700 to be restored to source file 80 (line indicia 76 in FIG. 3) during reverse translation when the marker characters 273, 275 and 277 . . . are replaced by corresponding hex values 264, 266, 268, and the other (non-marker) values translated back from ASCII to EBCDIC using mapping table 74 in steps 200 and 210.

TABLE 1

EXAMPLE EBCDIC VERSION

```
1  EBCDIC:
2  000200    ************************************************************
3  000300    *        PASSWORD ENCRYPTION WORK AREAS              *
4  000400    ************************************************************
5  002600           05  WS-PWD-TABLE-1    PIC X(50)       VALUE
6  002700             ' `~!@#$%^&*( )_+-={ }|[ ]\:";< >?,./ó¼        '.
7  003400           05  WS-PWD-TABLE-2    PIC X(50)       VALUE
8  003500             '     ¼ó/.,;\] [=- `?> <":|} {+_) (*& ^%$#@!~    '.
9  004000    ************************************************************
```

TABLE 2

EXAMPLE ASCII VERSION

```
1  ASCII:
2  000200    ************************************************************
3  000300    *        PASSWORD ENCRYPTION WORK AREAS              *
4  000400    ************************************************************
5  002600           05  WS-PWD-TABLE-1    PIC X(50)       VALUE
6  CT0010             '~~!@#$%~&*( )_+-→~~|~~~:";< >?,./~~        '.
7  003400           05  WS-PWD-TABLE-2    PIC X(50)       VALUE
8  CT0020             '   ~~/..;~~~=-~?> <":|~~+_) (*&~%$#@!~    '.
9  004000    ************************************************************
10          *COBTRAN START  FOR CHARACTER TRANSLATION USE ONLY  V0.03
11 002700   *COBTRAN CT0010 10 01 10 79 A1 B0 C0 D0 BA BB E0 4A 5F
12 003500   *COBTRAN CT0020 10 01 10 5F 4A E0 BB BA 79 D0 C0 B0 A1
13          *COBTRAN END ~ F 00080 037    ISO-8    19981026 12:12:20
```

Referring to Table 3, the invention may be used, for example, to download and upload mainframe 20 Cobol source code to and from a Windows 95 workstation 22, where the source code is processed by a non-IBM Year 2000 tool set.

TABLE 3

ASCII TRANSLATIONS FOR COBOL PROGRAMS

```
1   /*   CobTran: Safe EDCDIC <-> ASCII translations for Cobol programs          */
2   /*      perform : program initiation                                         */
3   trace n
4   signal on notready name ReadyErr
5   signal on error name ErrorErr
6   signal on failure name ErrorErr
7   signal on syntax name ErrorErr
8   call rxfuncadd 'sysloadfuncs', 'REXXUTIL', 'sysloadfuncs'
9   call sysloadfuncs
10  CRLF = x2c('0d0a')
11  parse arg CtlFile
12  if CtlFile = ' '
13      then do
14          Help =        'CobTran syntax' CRLF CRLF
15          Help = Help   'To translate Cobol programs:' CRLF
16          Help = Help   '   rexxhide [path\]cobtran.rex [path\]yourcobtran.ctl'
17  CRLF CRLF
18          Hel
19          Help = Help   '   rexxhide [path\]cobtan.rex +[path\]' CRLF CRLF
20          Help = Help   'The control (ctl) file specifies the inputs, outputs, ' ,
21                        'and parameters'
22          call rxmessagebox Help, 'CobTran Help' CobTranVer,, 'information'
23          exit 0
24          end
25  if left(strip(CtlFile), 1) = '+'
26      then do
27          if CtlFile =    '+'
28              then CtlFile = directory( ) '\CobTran.ctl'
29              else CtlFile = right(CtlFile, length(CtlFile)–1) 'CobTran.ctl'
30          CtlLine.1  =    " "
31          CtlLine.2  =    "/* CobTran Character Translation control file"
32                             CobTranVer "*/"
33          CtlLine.3  =    "/* Each line must be valid Rexx interpret syntax */"
34          CtlLine.4  =    " "
35          CtlLine.5  =    "                      /* 'EtoA' or 'AtoE', E: EBCDIC, A: ASCII */"
36          CtlLine.6  =    "Direction             = 'EtoA'"
37          CtlLine.7  =    " "
38          CtlLine.8  =    "                      /* File id or file id with wildcards */"
39          CtlLine.9  =    "InpFiles              = 'e:\cust\pl\download\*.*'"
40          CtlLine.10 =    " "
41          CtlLine.11 =    "                      /* Directory name, must end with '\' */"
42          CtlLine.12 =    "OutDir                = 'e:\cust\pl\ascii\'"
43          CtlLine.13 =    " "
44          CtlLine.14 =    "                      /* 'F' or 'V' (only 'F' for now) */"
45          CtlLine.15 =    "RecFM                 = 'F'"
46          CtlLine.16 =    " "
47          CtlLine.17 =    "                      /* >= 80 */"
48          CtlLine.18 =    "LRecL                 = 80"
49          CtlLine.19 =    " "
50          CtlLine.20 =    "                      /* EBCDIC code page (only '037' for now)*/"
51          CtlLine.21 =    "EPage                 = '037'"
52          CtlLine.22 =    " "
53          CtlLine.23 =    "                      /* ASCII code page (only 'ISO-8' for now)*/"
54          CtlLine.24 =    "APage                 = 'ISO-8'"
55          CtlLine.25 =    " "
56          CtlLine.26 =    "                      /* Translate table file id */"
57          CtlLine.27 =    "                      /* If used, 'InpFiles' and 'OutDir' are */
58                                                 /* not used */"
59          CtlLine.28 =    "/*OutTable            'e:\cust\pl\CobTran.tbl' */"
60          CtlLine.29 =    " "
61          CtlLine.30 =    "                      */ Can't be in CharSet or be a control    */
62                                                 /* character */"
63      /*  HERE IS THE MARK CHARACTER 75 (FIG. 2)                                          */
64          CtlLine.31 =    "MarkChar              = '~'"
65          CtlLine.32 =    " "
66      /*  HERE ARE THE SAFE AND STANDARD CHARACTERS                                       */
67      /*  FOR MAPPING TABLE 74 (FIG. 2)                                                   */
68          CtlLine.33 =    "                      /* Usually safe characters that translate
69                                              /* between */"
70          CtlLine.34 =    "                      /*    EBCDIC code page 037 and ASCII ISO-8*/"
71          CtlLine.35 =    "                      /* The first three lines are required for */
72                                                 /* Cobol */"
73          CtlLine.36 =    "                      /* The fourth line is optional for Cobol */"
74          CtlLine.37 =    "CharSet                       = 'abcdefghijklmnopqrstuvwxyz'"
75          CtlLine.38 =    "CharSet               = CharSet'ABCDEFGHIJKLMNOPQRSTUVWXYZ'"
76          CtlLine.39 =    "CharSet               = CharSet'0123456789 +=*=/$,;:" "( )< >:' '#@'"
77          CtlLine.40 =    "CharSet               = CharSet'_!%?&|'"
```

TABLE 3-continued

ASCII TRANSLATIONS FOR COBOL PROGRAMS

```
78          CtlLine.41 = " "
79          if stream(CtlFile, 'c', 'query exists') \= ' '
80              then call sysfiledelete CtlFile
81          x = stream(CtlFile, 'c', 'open write')
82          do I = 1 to 29
83              x = lineout(CtlFile, left(CtlLine.I, 80))
84              end
85          x = stream(CtlFile, 'c', 'close')
86          call rxmessagebox 'Example control file created:' CtlFile,,
87                              'CobTran Help' CobTranVer,, 'information'
88          exit 0
89          end
90      if stream(CtlFile, 'c', 'query exists') = ' '
91        then do
92          call ErrMsg 'Control file does not exist:' CtlFile
93          exit 8
94          end
95      /*  perform: verify the file exists                                          */
96      x = stream(CtlFile, 'c', 'open read')
97      do while lines(CtlFile) \= 0
98          interpret linein(CtlFile)
99          end
100     x = stream(CtlFile, 'c', 'close')
101     /*  perform: validate the control file values and check consistency          */
102     /*  perform: check if MarkChar character is in CharSet                       */
103     if symbol('MarkChar') \= 'VAR'
104       then MarkChar = '~'
105     if symbol('CharSet') \= 'VAR'
106       then do
107          CharSet  =              'abcdefghijklmnopqrstuvwxyz'
108          CharSet  =    CharSet'ABCDEFGHIJKLMNOPQRSTUVWXYZ'
109          CharSet  =    CharSet'0123456789 +-*=/$,;."( )< >:' '#@'
110          CharSet  =    CharSet'_!%?&|'
111          end
112     if /* no errors */
113       then do
114          /*  EBCDIC 94 character set on 037 code page and ASCII ISO-8  */
115          /*      except for characters Numeric-space and Eight-ones   */
116          /*  Non-keyboard characters are in hex                       */
117          E = copies(MarkChar, 256)
118          E = overlay(' '              , E, 1+x2d('40'), 1)
119     /*   E = overlay('a0'x            , E, 1+x2d('41'), 1)  */  /*   required space  */
120     /*   E = overlay('a2'x            , E, 1+x2d('4a'), 1)  */  /*   cent   */
121          E = overlay('.<(+|&'         , E, 1+x2d('4b'), 6)
122          E = overlay('!$*);'          , E, 1+x2d('5a'), 5)
123     /*   E = overlay('ac'x            , E, 1+x2d('5f'), 1)  */  /*   logical not  */
124          E = overlay('-/'             , E, 1+x2d('60'), 2)
125     /*   E = overlay('a6'x            , E, 1+x2d('6a'), 1)  */  /*   split vertical bar*/
126          E = overlay(',%_>!'          , E, 1+x2d('6b'), 5)
127          E = overlay(':#@' '="'       , E, 1+x2d('7a'), 6)
128          E = overlay('abcdefghi',     E,1+x2d('81'), 9)
129          E = overlay('jklmnopqr',     E,1+x2d('91'), 9)
130          E = overlay('stuvwxyz',      E,1+x2d('a2'), 8)
131          E = overlay('ABCDEFGHI',     E,1+x2d('c1'), 9)
132     /*   E = overlay('ad'x            , E, 1+x2d('ca'), 1)  */  /*   syllable hyphen  */
133          E = overlay('JKLMNOPQR',     E,1+x2d('d1'), 9)
134          E = overlay('STUVWXYZ',      E,1+x2d('e2'), 8)
135          E = overlay('0123456789'     , E, 1+x2d('f0'), 10)
136          end
137     /*      BUILD MAPPING TABLE 74 (FIG. 2).                                     */
138     /*      E TO A MEANS EBCDIC TO ASCII                                         */
139     if /* no errors */
140       then do
141          CharErr = 0
142          EtoA = copies(MarkChar, 256)
143          do I = 1 to length(CharSet)
144              P = pos(substr(CharSet, I, 1), E)
145              if P = 0
146                then do
147                    call ErrMsg   'CharSet character' substr(CharSet, I, 1) ,
148                              'at position' I 'cannot be translated.' CRLF ,
149                              'It should be removed from CharSet.'
150                    CharErr = 1
151                    end
152                else do
153                    EtoA = overlay(substr(CharSet, I, 1), EtoA, P, 1)
154                    end
```

TABLE 3-continued

ASCII TRANSLATIONS FOR COBOL PROGRAMS

```
155                    end
156                end
157            call sysfiletree InpFiles, 'IFiles', 'fo'
158            /*   perform: verify input file and directory exist      */
159            do I = 1 to IFiles.0
160                OFiles.I = OutDir || filespec('n', IFiles.I)
161                end
162            if /* errors */
163                then exit 8
164            if translate(Direction) = 'ETOA'
165                then call E_to_A
166                else call A_to_E
167            exit 0
168            /*       READ INPUT FILE FOR THE E TO A PATH                            */
169            E_to_A:
170            do File = 1 to IFiles.0
171                InpFile = IFiles.File
172                OutFile = OFiles.File
173                x = stream(InpFile, 'c', 'open read')
174                Inp = charin(InpFile, 1, chars(InpFile))
175                x = stream(InpFile, 'c', 'close')
176                InpLen = length(Inp)
177                if InpLen = 0
178                  then do
179                      call ErrMsg 'InpFile' InpFile 'is empty'
180                      exit 8
181                      end
182                if translate(RecFm) = 'F' & InpLen//LRecL \= 0
183                  then do
184                      call ErrMsg 'InpFile' InpFile 'length' InpLen ,
185                          'is not an exact multiple of LRecL' LRecL
186                      exit 8
187                      end
188                Marked. = ' '
189                TotMarks = 0
190                MarkRecs = 0
191                if stream(OutFile, 'c', 'query exists') \= ' '
192                    then call sysfiledelete OutFile
193                x = stream(OutFile, 'c', 'open write')
194                x = lineout(OutFile,, 1)
195            /*    MAIN LOOP FOR TRANSLATION AND MARKING                               */
196                do I = 1 to length(Inp) by LRecL
197                    Out = translate(substr(Inp, I, LRecL), EtoA)
198                    P = pos(MarkChar, Out)
199                    if P \= 0
200                      then do
201                          MarkRecs = MarkRecs+1
202                          do while P \= 0
203                              TotMarks = TotMarks+1
204                              Marked.MarkRecs = Marked.MarkRecs c2x(substr(Inp, I+P-1, 1))
205                              P = pos(MarkChar, Out, P+1)
206                              end
207                          Rec.MarkRecs = left(Out, 6)
208                          Out = overlay('CT'right(MarkRecs, 3, '0') '0', Out)
209                          end
210                    x = lineout(OutFile, left(Out, LRecL))
211                    end
212            /*    PUT OUT COMMENTS TABLE AT BOTTOM (END) OF SOURCE PROGRAM    */
213                Out = '         *COBTRAN START ** FOR CHARACTER TRANSLATION USE ONLY **'
214             `
215                        CobTranVer
216                x = lineout(OutFile, left(Out, LRecL))
217                MarksPerLine = 12
218                CTRecs = 0
219                do Seq = 1 to MarkRecs
220                    /*    coll-6*COBTRAN CTrecid marksInRecord numOfFirstMark marksOnLine
221                    /*         marks        */
222                    RecMarks = words(Marked.Seq)
223                    Header = left(Rec.Seq, 6)'*COBTRAN CT'right(Seq, 3, '0')'0' ,
224                                right(RecMarks, 2, '0')
225                    do LineMarks = 1 to RecMarks by MarksPerLine
226                        Marks = subword(Marked.Seq, LineMarks, MarksPerLine)
227                        Out = Header right(LineMarks, 2, '0'),
228                              right(min(MarksPerLine, words(Marks)), 2, '0')
229                        Out = Out Marks
230                        x = lineout(Outfile, left(Out, LRecL))
231                        CTRecs = CTRecs+1
```

TABLE 3-continued

ASCII TRANSLATIONS FOR COBOL PROGRAMS

```
232                  end
233              end
234          Out = '           *COBTRAN END' MarkChar translate(RecFm)
235      right(LRecL, 5, '0') ,
236              left(translate(EPage), 8) left(translate(APage), 8) date('s')
237      time('n')
238          x = lineout(OutFile, left(Out, LRecL))
239          x = stream(OutFile, 'c', 'close')
240          end
241      /*      REVERSE PATH: A TO E PATH START                                */
242      call rxmessagebox IFiles.0 'files translated', 'CobTran'
243      CobTranVer,, 'information'
244      return
245      A_to_E:
246      do File = 1 to IFiles.0
247          InpFile = IFiles.File
248          OutFile = OFiles.File
249      /*      BUILD A TO E TABLE FROM E TO A TABLE (FIG. 2 MAPPING TABLE 74) */
250          AtoE = copies('a1'x, 256)      /*  tilde ~    */
251          P = verify(EtoA, MarkChar)
252          do while P \= 0
253              AtoE = overlay(d2c(P-1), AtoE, 1+c2d(substr(EtoA, P, 1)))
254              P = verify(EtoA, MarkChar,, P+1)
255              end
256      /*      FIND BOTTOM OF COMMENTS TABLE BY READING UP FROM
257      /*      BOTTOM TO FIND START OF TABLE                                  */
258          x = stream(InpFile, 'c', 'open')
259          do I = 1 by 1 while lines(InpFile) > 0
260              InpLine.I = left(linein(InpFile), LrecL)
261              end
262          x = stream(InpFile, 'c', 'close')
263          InpLine.0 = I-1
264          Last = InpLine.0
265          do CTEnd = Last to 1 by -1 ,
266                  while left(InpLine.CTEnd, 19) \== '        *COBTRAN END '
267              end
268          if CTEnd < 1
269            then do
270              call ErrMsg InpFile 'does not contain *COBTRAN END '
271              exit 8
272              end
273      /*      END OF TABLE FOUND                                              */
274      /*      READ AND PROCESS END RECORD                                    */
275          parse var InpLine.CTEnd . 7 '*COBTRAN END' MarkUsed RecFmUsed
276          LRecLUsed, EPageUsed APageUsed .
277      /*  perform: verify control file values match saved values              */
278      /*      FIND TABLE START                                                */
279          do CTStart = CTEnd-1 to 1 by -1 while ,
280                      left(InpLine.CTStart, 24) \== '    *COBTRAN START ** '
281              end
282          if CTStart < 1
283            then do
284              call ErrMsg InpFile 'does not have *COBTRAN START ** line'
285              exit 8
286              end
287          Out = ' '
288          Inp = 0
289      /*      READ RECORDS FROM START TO END AND BUILD COMMENTS TABLE        */
290          do CT = CTStart+1 to CTEnd-1
291            if verify(InpLine.CT, CharSet) \= 0
292              then do
293      /*      START: CAPTURE AND PARSE INDIVIDUAL LINES IN TABLE             */
294            parse var InpLine.CT Coll_6 '*COBTRAN CT' Seq ,
295                  MarksOnLine MarkNum MarksOnRec MarksRec 73 .
296      /*      READ LINE IN SOURCE CODE                                        */
297            do Inp = Inp+1 to Last while left(InpLine.Inp, 2) \= 'CT'
298                if substr(InpLine.Inp, 7, 9) \= '*COBTRAN '
299                  then do
300                    if verify(InpLine.Inp, CharSet) \= 0
301                      then do
302                        call ErrMsg 'Character not translated by CobTran ''' ||,
303                            substr(InpLine.Inp, verify(InpLine.Inp, CharSet), 1) ||,
304                            ''', line' Inp InpFile
305                      exit 8
306                      end
307                    Out = Out || translate(InpLine.Inp, AtoE)
308                  end
```

TABLE 3-continued

ASCII TRANSLATIONS FOR COBOL PROGRAMS

```
309              end
310       /*     FIND MARKER CHARACTERS ON LINE AND PROCESS THEM              */
311          Marks = MarksRec
312          do M = 13 to MarksOnLine by 12
313             CT = CT+1
314             parse var InpLine.CT . '*COBTRAN CT' Seq ,
315                                 MarksOnLine MarkNum MarksOnRec MarsRec 73 .
316             if substr(InpLine.Inp, 3, 4) \== Seq | M \= MarkNum
317                then do
318                   call ErrMsg 'CT control fields out of sequence, lines' ,
319                           Inp CT InpFile
320                   exit 8
321                end
322             Marks = Marks MarksRec
323          end
324       /*     END: CAPTURE AND PARSE INDIVIDUAL LINES IN TABLE              */
325       /*     TRANSLATE AND RESTORE ORIGINAL CHARACTER                      */
326          OutLine = overlay(Coll_6, InpLine.Inp, 1)
327          MarkLine = OutLine
328          OutLine = translate(OutLine, AtoE)
329          P = 0
330          do M = 1 to MarksOnLine
331             P = pos(MarkUsed, MarkLine, P+1)
332             if P > 0
333                then OutLine = overlay(x2c(word(Marks, M)), OutLine, P)
334                else do
335                   call ErrMsg 'Too few marks in source line' Inp InpFile
336                   exit 8
337                end
338          end
339       /*     CHECK TO BE SURE DON'T TRANSLATE THE TABLE ITSELF             */
340          if pos(MarkUsed, MarkLine, P+1) \= 0
341             then do
342                call ErrMsg 'Too many marks in source line' Inp InpFile
343                exit 8
344             end
345          Out = Out || OutLine
346          end
347       do Inp = Inp+1 to Last
348          if substr(InpLine.Inp, 7, 9) \= '*COBTRAN '
349             then do
350                if verify(InpLine.Inp, CharSet) \= 0
351                   then do
352                      call ErrMsg 'Character not translated by CobTran ''' || ,
353                            substr(InpLine.Inp, verify(InpLine.Inp, CharSet), 1) || ,
354                            ''', line' Inp InpFile
355                      exit 8
356                   end
357                Out = Out || translate(InpLine.Inp, AtoE)
358             end
359       end
360       /*     OUTPUT EBCDIC SOURCE CODE IN BINARY                            */
361          if stream(OutFile, 'c', 'query exists') \= ' '
362             then call sysfiledelete OutFile
363          x = stream(OutFile, 'c', 'open write')
364          x = charout(OutFile,, 1)
365          x = charout(OutFile, Out)
366          x = stream(OutFile, 'c', 'close')
367       end
368       call rxmessagebox IFiles.0 'files translated', 'CobTran'
369       CobTranVer,, 'information'
370       return
371       ErrMsg:
372       call rxmessagebox arg(1), 'CobTran Error' CobTranVer,, 'exclamation'
373       return
374       ErrorErr:
375       call rxmessagebox 'Error on line' sigl CRLF condition('d') ,
376            CRLF strip(sourceline(sigl)), 'CobTran Error'
377       CobTranVer,, 'exclamation'
378       exit 12
379       ReadyErr:
380       call rxmessagebox 'File error on line' sigl CRLF condition('d') ,
381            . CRLF strip(sourceline(sigl)), 'CobTran Error'
382       CobTranVer,, 'exclamation'
383       exit 12
```

ADVANTAGES OVER THE PRIOR ART

It is an advantage of the invention that there is provided an improved system and method for translating source code.

It is an advantage of the invention that there is provided a system and method for translating source code such that it is possible to move mainframe software source code to a workstation, operate on the code, and move it back to the mainframe, knowing that the character translations are safe and reversible.

It is an advantage of the invention that there is provided a system and method for translating source code which eliminates errors due to unsafe and un-reversible translations both on the workstation and on the mainframe.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Also, while the use of line and mark indicia are used in the preferred embodiment to improve error detection, usability, and performance, in an alternative embodiment a safe and reversible translation still occurs where the translation saves marked characters in the order encountered in the source file and the reverse translation examines every character in the processed file for a marker character.

Accordingly, the scope of protection of this invention is limited only by the following claims and their equivalents.

What is claimed is:

1. A method for translating a code string of characters, comprising the steps of:
    translating syntactically necessary characters from a first format to a second format;
    replacing other said characters with a marker character and preserving the original source character in a comment;
    reverse translating said syntactically necessary characters from said second format back into said first format; and
    restoring said marker character to said original source character.

2. The method of claim 1, further comprising the optional step of:
    for each line of characters including a marker character, replacing the line indicia for said line with a mark indicia and preserving said line indicia associated with said mark indicia in said comment.

3. The method of claim 2, further comprising the step of:
    restoring said line indicia for said mark indicia upon restoring said marker character to said original source character.

4. A method for preparing from a source file in a first format, a translated file in a second format, and restoring a processed translated file from said second format back into a processed source file in said first format, the method comprising the steps of:
    providing a mapping table for syntactically necessary characters;
    designating a marker character;
    preparing said translated file by
        examining each line of said source file character by character against characters in said mapping table,
            for each source file character for which a mapping table entry exists, translating said source file character into said second format, and
            for each source file character for which a mapping table entry does not exist, replacing said source file character with said marker character and saving said source file character in a comment file;
        replacing the line indicia of each line in said translated file containing a marker character with a mark indicia and saving said line indicia associated with said mark indicia in said comment file with said source file characters replaced by said marker character; and
    preparing said reverse translated file by
        examining each line of said translated file to (1) determine if such line is identified by a said mark indicia; (2) translate each character found in said mapping table back into said first format; and (3) access said comment file to translate each said marker character back into its corresponding character in said first format;
        for lines not identified by a said mark indicia, preparing a corresponding line in said reverse translated file including its line indicia and said characters translated back into said first format; and
        for lines identified by said mark indicia, preparing a corresponding line in said reverse translated file including (1) the line indicia saved in said comment file for this said mark indicia, and (2) source characters replacing said marker characters and source characters translated back into said first format.

5. System for translating a code string of characters, comprising:
    a mapping table for translating syntactically necessary characters from a first format to a second format;
    a marker character for replacing other said characters;
    a comment file for preserving characters from said code string replaced by said marker character;
    said mapping table also reverse translating said syntactically necessary characters from said second format back into said first format; and
    said comment file also for restoring said marker character to said characters from said code string replaced by said marker character.

6. A program storage device readable by a machine, tangibly embodying a program of instructions executable by a machine to perform method steps for translating a code string of characters, said method steps comprising:
    translating syntactically necessary characters from a first format to a second format;
    replacing other said characters with a marker character and preserving the original source character in a comment;
    reverse translating said syntactically necessary characters from said second format back into said first format; and
    restoring said marker character to said original source character.

7. An article of manufacture comprising:

a computer useable medium having computer readable program code means embodied therein for translating a code string of characters, the computer readable program means in said article of manufacture comprising:

computer readable program code means for causing a computer to effect translating syntactically necessary characters from a first format to a second format;

computer readable program code means for causing a computer to effect replacing other said characters with a marker character and preserving the original source character in a comment;

computer readable program code means for causing a computer to effect reverse translating said syntactically necessary characters from said second format back into said first format; and computer readable program code means for causing a computer to effect restoring said marker character to said original source character.

8. A computer program product or computer program element for translating a code string of characters according to the steps of:

translating syntactically necessary characters from a first format to a second format;

replacing other said characters with a marker character and preserving the original source character in a comment;

reverse translating said syntactically necessary characters from said second format back into said first format; and restoring said marker character to said original source character.

* * * * *